United States Patent
Hsiao et al.

(10) Patent No.: US 8,139,320 B2
(45) Date of Patent: Mar. 20, 2012

(54) WRITE HEAD HAVING INDEPENDENT SIDE SHIELD AND TRAILING SHIELD THROAT HEIGHT

(75) Inventors: Wen-Chien David Hsiao, San Jose, CA (US); Yinshi Liu, Foster City, CA (US); Yi Zheng, San Ramon, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1025 days.

(21) Appl. No.: 11/966,086

(22) Filed: Dec. 28, 2007

(65) Prior Publication Data

US 2009/0168257 A1 Jul. 2, 2009

(51) Int. Cl.
*G11B 5/127* (2006.01)

(52) U.S. Cl. .......... 360/125.07; 360/125.15; 360/123.12

(58) Field of Classification Search .............. 360/125.15, 360/123.12, 125.07, 123.09, 123.58, 123.49, 360/125.11, 125.1, 125.14, 125.3, 125.08, 360/125.12

See application file for complete search history.

(56) References Cited

U.S. PATENT DOCUMENTS

| | | | | |
|---|---|---|---|---|
| 5,075,956 A * | 12/1991 | Das | ............................ | 29/603.14 |
| 6,305,072 B1 | 10/2001 | Yoda et al. | .................. | 29/603.14 |
| 6,669,855 B2 | 12/2003 | Sasaki et al. | ..................... | 216/22 |
| 6,694,604 B2 | 2/2004 | Santini | ........................ | 29/603.14 |
| 6,775,902 B1 | 8/2004 | Huai et al. | .................. | 29/603.14 |
| 6,980,403 B2 | 12/2005 | Hasegawa | ...................... | 360/319 |
| 7,100,266 B2 | 9/2006 | Plumer et al. | .............. | 29/603.14 |
| 2005/0141137 A1 * | 6/2005 | Okada et al. | ................... | 360/122 |
| 2005/0190491 A1 | 9/2005 | Le et al. | ......................... | 360/122 |
| 2006/0044682 A1 | 3/2006 | Le et al. | ......................... | 360/126 |
| 2006/0198049 A1 * | 9/2006 | Sasaki et al. | ................... | 360/126 |
| 2007/0035878 A1 | 2/2007 | Guthrie et al. | ................ | 360/125 |
| 2008/0259498 A1 * | 10/2008 | Lengsfield et al. | ......... | 360/235.4 |
| 2009/0283205 A1 * | 11/2009 | Miyazawa et al. | ............ | 156/154 |

\* cited by examiner

*Primary Examiner* — Julie Anne Watko
(74) *Attorney, Agent, or Firm* — Zilka-Kotab, PC

(57) ABSTRACT

A magnetic write head for perpendicular magnetic recording. The magnetic write head includes a write pole having a pole tip region and a flared region. The write pole also has a trailing, wrap-around magnetic shield that is separated from the sides of the write pole by a non-magnetic side gap layer. The write head is formed such that the side gap spacing is larger in the flared region than in the pole tip region. This varying gap spacing can be formed by depositing a non-magnetic material using a collimated sputter deposition aligned substantially perpendicular to the air bearing surface. This collimated sputtering deposits the non-magnetic material more readily on the sides of the write pole in the flared region than in the pole tip region.

3 Claims, 25 Drawing Sheets

WRITE HEAD HAVING INDEPENDENT SIDE SHIELD AND TRAILING SHIELD THROAT HEIGHT

FIELD OF THE INVENTION

The present invention relates to perpendicular magnetic recording and more particularly to a method for manufacturing a magnetic write head with a wrap-around trailing shield having a side gap in a flared region that is larger than a side gap in the pole tip region.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head has traditionally included a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs, a GMR or TMR sensor has been employed for sensing magnetic fields from the rotating magnetic disk. The sensor includes a nonmagnetic conductive layer, or barrier layer, sandwiched between first and second ferromagnetic layers, referred to as a pinned layer and a free layer. First and second leads are connected to the sensor for conducting a sense current there-through. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

SUMMARY OF THE INVENTION

The present invention provides a magnetic write head for perpendicular magnetic recording. The magnetic write head includes a write pole having a pole tip region and a flared region. The write pole also has a trailing, wrap-around magnetic shield that is separated from the sides of the write pole by a non-magnetic side gap layer. The write head is formed such that the side gap spacing is larger in the flared region than in the pole tip region.

This varying gap spacing can be formed by depositing a non-magnetic material using a collimated sputter deposition aligned substantially perpendicular to the air bearing surface. This collimated sputtering deposits the non-magnetic material more readily on the sides of the write pole in the flared region than in the pole tip region.

A collimated sputter deposition can also be used to form a write head having a stitched pole structure with a front edge and with a magnetic shield gap spacing at the front edge of the stitched pole that is smaller than at the sides.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
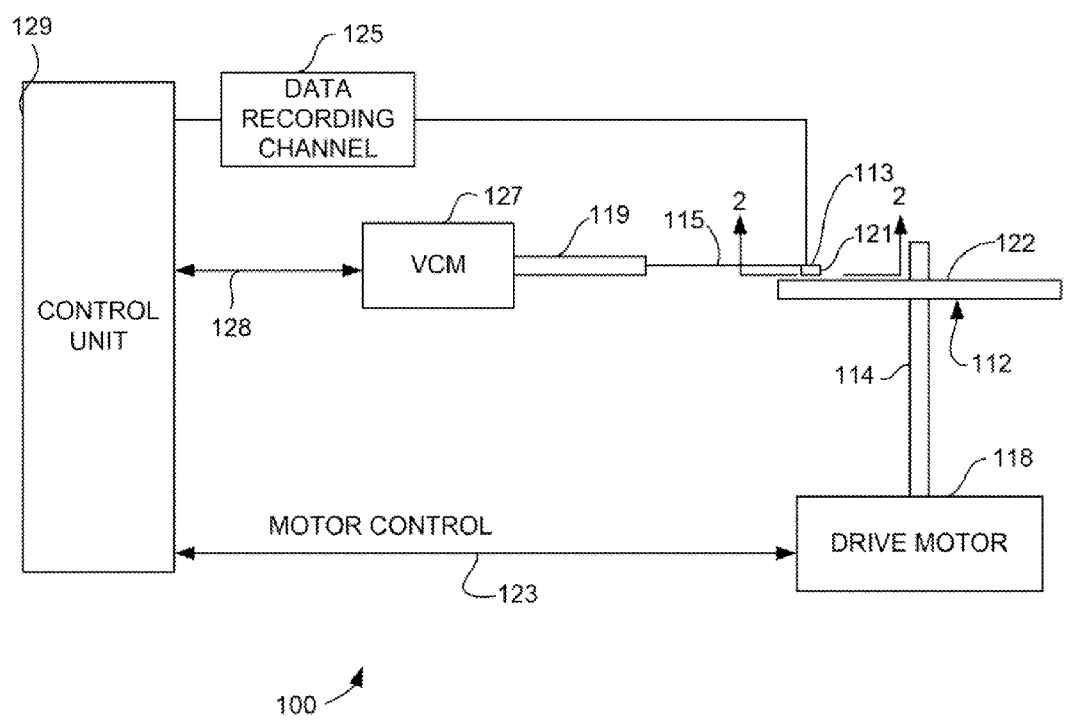
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
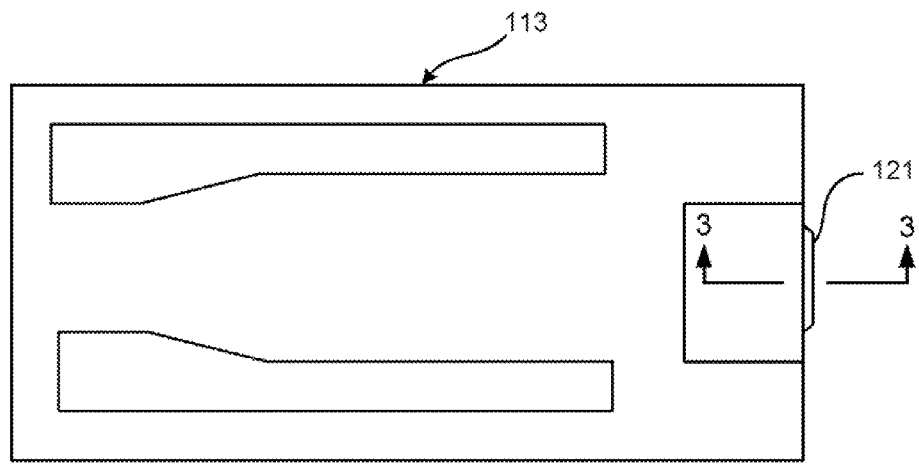
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3A:
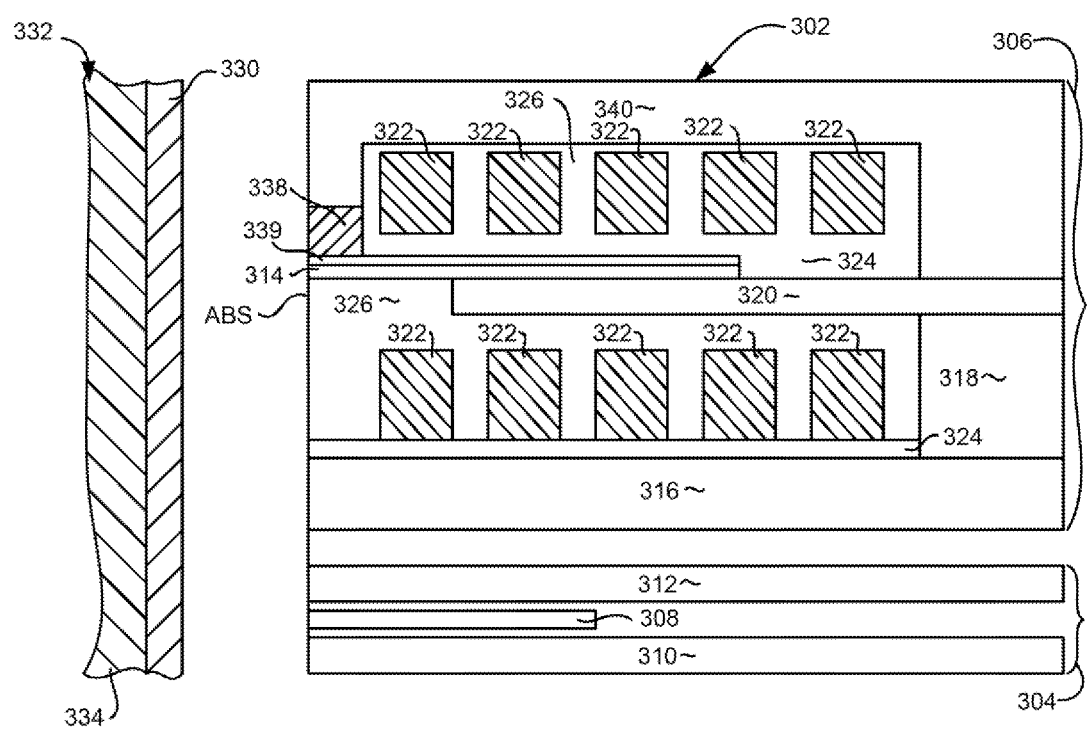
FIG. 3 is a cross sectional view of a magnetic head, taken from line 3-3 of FIG. 2 and rotated 90 degrees counterclockwise, of a magnetic write head according to an embodiment of the present invention.

With reference now to FIG. 3A, the invention can be embodied in a magnetic head 302. The magnetic head 302 includes a read head 304 and a write head 306. The read head 304 includes a magnetoresistive sensor 308, which can be a GMR, TMR, or some other type of sensor. The magnetoresistive sensor 308 is located between first and second magnetic shields 310, 312.

The write head 306 includes a magnetic write pole 314 and a magnetic return pole 316. The write pole 314 can be formed upon a magnetic shaping layer 320, and a magnetic back gap layer 318 magnetically connects the write pole 314 and shaping layer 320 with the return pole 316 in a region removed from the air bearing surface (ABS). A write coil 322 (shown in cross section in FIG. 3A) passes between the write pole and shaping layer 314, 320 and the return pole 316, and may also pass above the write pole 314 and shaping layer 320. The write coil can be a helical coil or can be one or more pancake coils. The write coil 322 can be formed upon an insulation layer 324 and can be embedded in a coil insulation layer 326 such as alumina and or hard baked photoresist.

In operation, when an electrical current flows through the write coil 322. A resulting magnetic field causes a magnetic flux to flow through the return pole 316, back gap 318, shaping layer 320 and write pole 314. This causes a magnetic write field to be emitted from the tip of the write pole 314 toward a magnetic medium 332. The write pole 314 has a cross section at the ABS that is much smaller than the cross section of the return pole 316 at the ABS. Therefore, the magnetic field emitting from the write pole 314 is sufficiently dense and strong that it can write a data bit to a magnetically hard top layer 330 of the magnetic medium 332. The magnetic flux then flows through a magnetically softer under-layer 334, and returns back to the return pole 316, where it is sufficiently spread out and week that it does not erase the data bit recorded by the write head 314.

In order to increase write field gradient, and therefore increase the speed with which the write head 306 can write data, a trailing, wrap-around magnetic shield 338 can be provided. The trailing magnetic shield 338 is separated from the write pole by a non-magnetic write gap 339, and may be connected with the shaping layer 320 and/or back gap 318 by a trailing return pole 340. The trailing shield 338 attracts the magnetic field from the write pole 314, which slightly cants the angle of the magnetic field emitting from the write pole 314. This canting of the write field increases the speed with which write field polarity can be switched by increasing the field gradient.

Figure 3B:
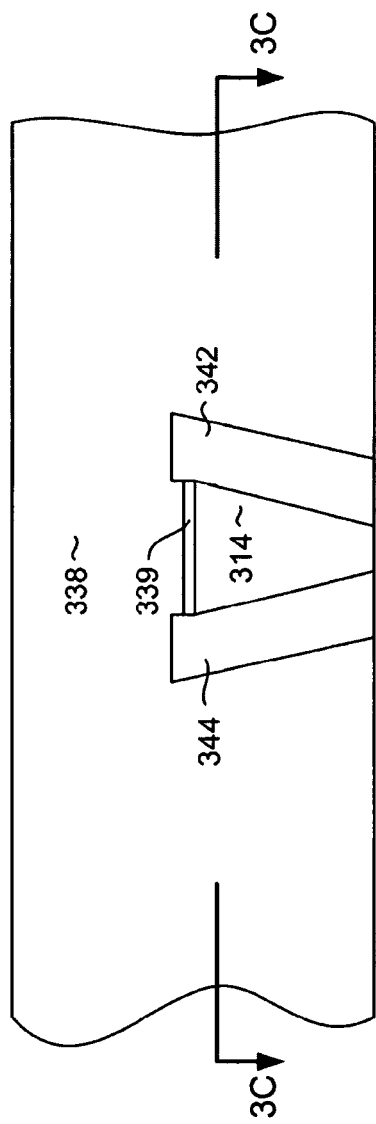

FIG. 3B shows an enlarged view of a portion of the write head 306 as viewed from the air bearing surface ABS. As seen in FIG. 3B, the write pole 314 preferably has a trapezoidal shape as viewed from the air bearing surface (ABS). The magnetic shield 338 wraps around the sides of the write pole 314, and is separated from the sides of the write pole 314 by non-magnetic side-gap layers 342, 344, which may be constructed of a material such as alumina.

Figure 3C:
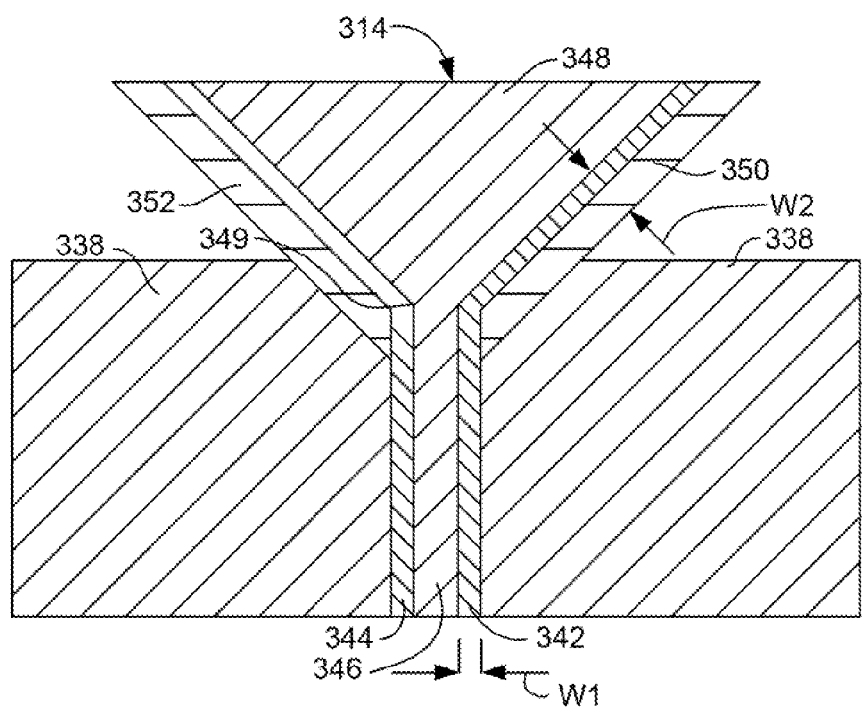

FIG. 3C shows a top down, cross sectional view as taken from line 3C-3C of FIG. 3B. With reference to FIG. 3C, it can be seen that the write pole 314 has a pole tip portion 346 with a relatively constant cross section, and has a flare portion 348 that flares laterally outward. The transition point between the pole tip portion 346 and the flared portion 348 defines a flare point 349.

With continued reference to FIG. 3C the side gap layers 342, 344 define a side gap having a width W1 in the pole tip region. However, in the flared region 348, an extra layer of non-magnetic side gap material 350, 352 at each side of the write pole 314 provides an increased side gap thickness W2 in the flared region. This increased side gap thickness W2 in the flared region 348 of the write pole results in improved magnetic performance and can be created by a novel manufacturing method that will be described herein below. The wider side gap thickness W2 improves magnetic performance of the write head by minimizing the loss of write field to the side portions of the shield 338 during writing, thereby ensuring maximum write field.

Figure 4:
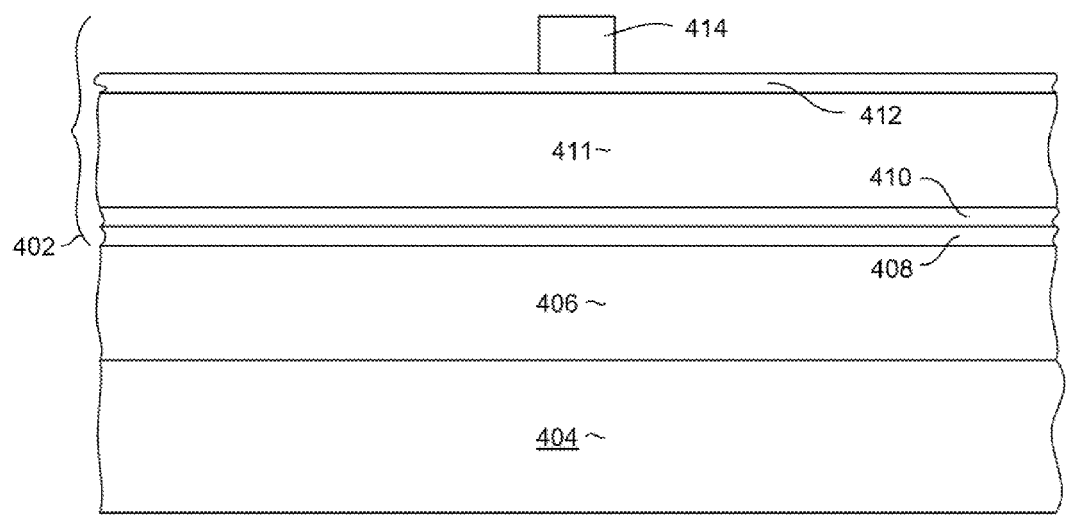
FIGS. 4-17 are views of a write head in various intermediate stages of manufacture illustrating method for manufacturing a write head according to an embodiment of the invention.

With reference now to FIGS. 4-17, a method is described for manufacturing a magnetic write head such as that described above. With particular reference to FIG. 4, a substrate 404 is provided. The substrate can include the insulation layer 326 and all or a portion of the shaping layer 320 described above with reference to FIG. 3A. A magnetic write pole layer 406 is deposited over the substrate. The magnetic write pole layer 406 is preferably a lamination of magnetic layers separated by thin non-magnetic layers.

A series of mask layers 402 is deposited over the write pole layer 406. The mask layers can include first and second hard mask layers 408, 410, an image transfer layer 411, a third hard mask layer 412 and a photoresist layer 414. First hard mask layer 408, can be a material such as alumina. The second hard mask is preferably a material that can be removed by reactive ion etching (RIE) such as SiN and is referred to herein as a RIEable hard mask layer 410. The image transfer layer 411 can be a polyimide material such as DURAMIDE® or some similar material. The third hard mask can be, for example, SiO₂. The photoresist layer 414 photolithographically patterned to define a write pole structure.

Figure 5:
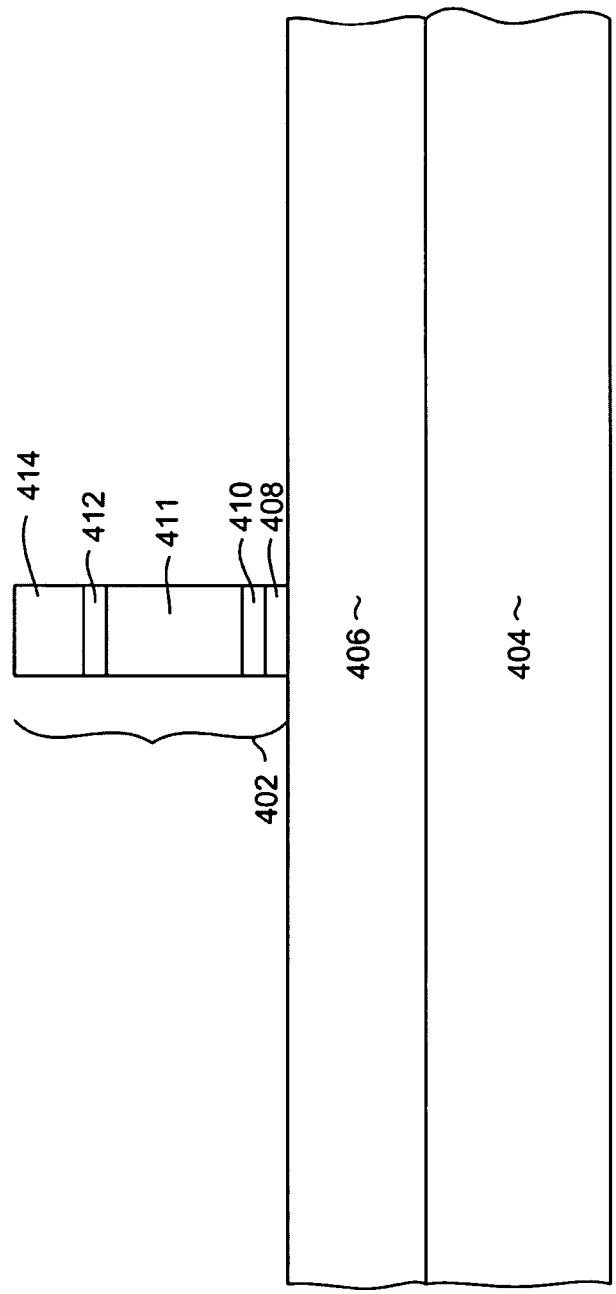
Figure 6:
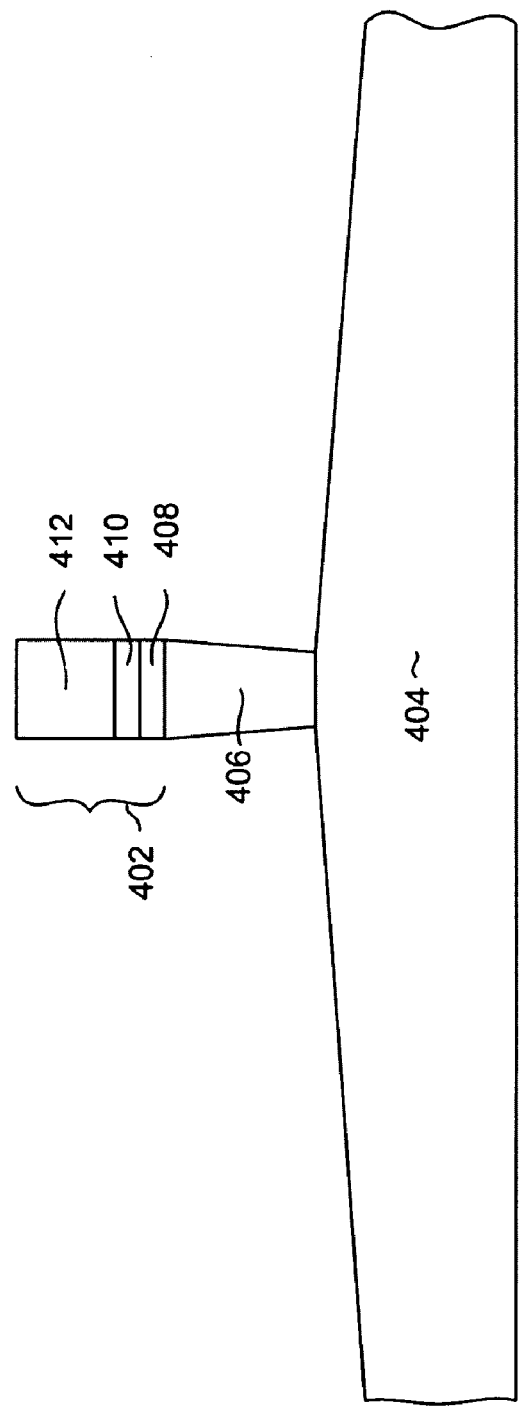

With reference to FIG. 5 one or more material removal processes such as reactive ion etching and or ion milling are performed to transfer the image of the patterned photoresist layer 414 onto the underlying mask layers 408-412. Then, with reference to FIG. 6, an ion milling is performed to remove portions of the write pole material 406 that are not protected by the mask layers 402. The ion milling removes the photoresist layer 414, third hard mask 412 and a portion of the image transfer layer 411, leaving the mask layers 402 as shown in FIG. 6. A wet stripping process then is performed to remove the remaining layer 412.

Figure 7:
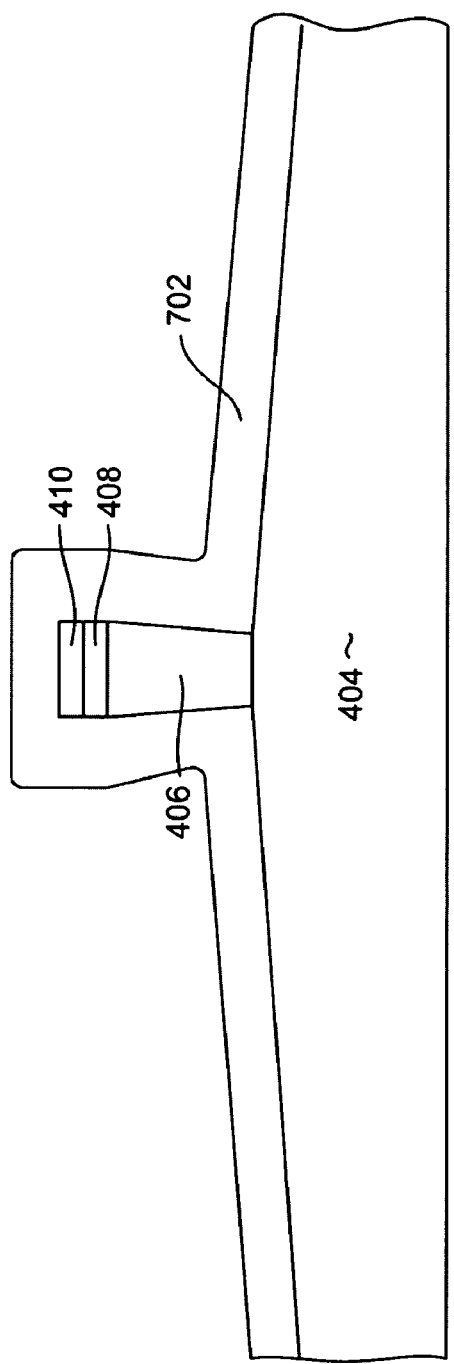
Figure 8:
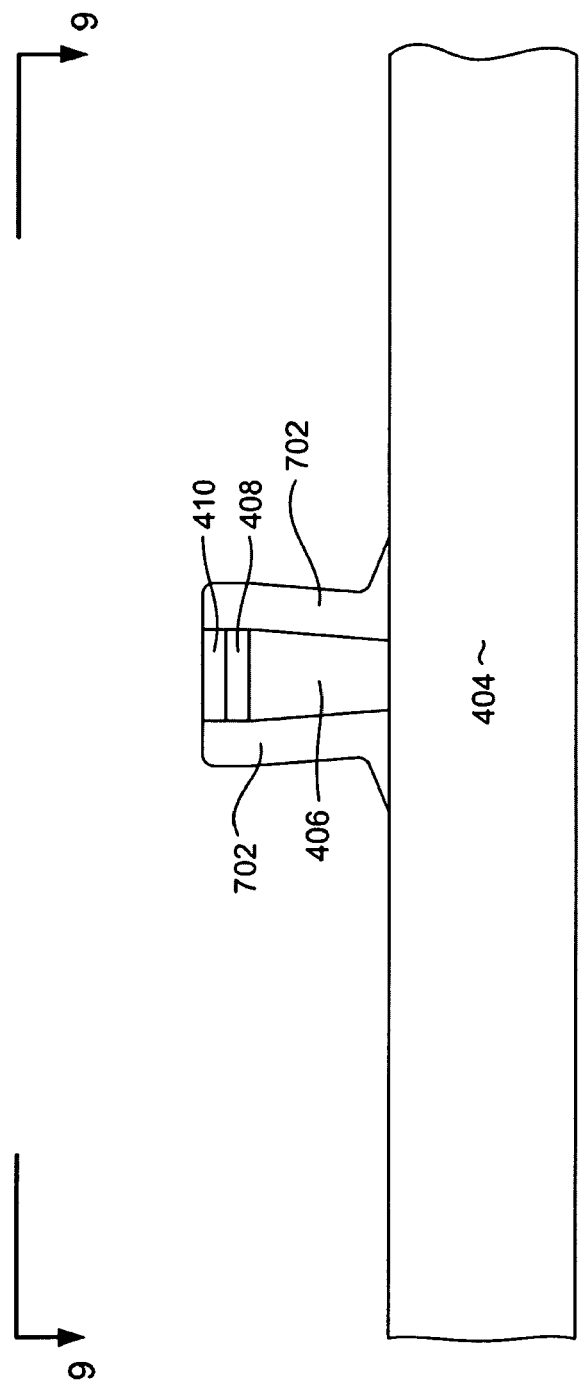

With reference now to FIG. 7, a layer of non-magnetic side gap material 702 is deposited. The non-magnetic side gap layer 702 can be alumina and can be deposited by a conformal deposition process such as atomic layer deposition (ALD) or chemical vapor deposition (CVD). A material removal process such as reactive ion milling (RIM) can be performed to preferentially remove horizontally disposed portions of the non-magnetic side gap layer 702, leaving non-magnetic side walls as shown in FIG. 8. In lieu of a reactive ion milling, a CMP process can be used to remove the horizontally disposed portions of the non-magnetic side gap layers 702. Such a method could include depositing a fill layer, performing a CMP process and then removing the fill layer by reactive ion etching.

Figure 9:
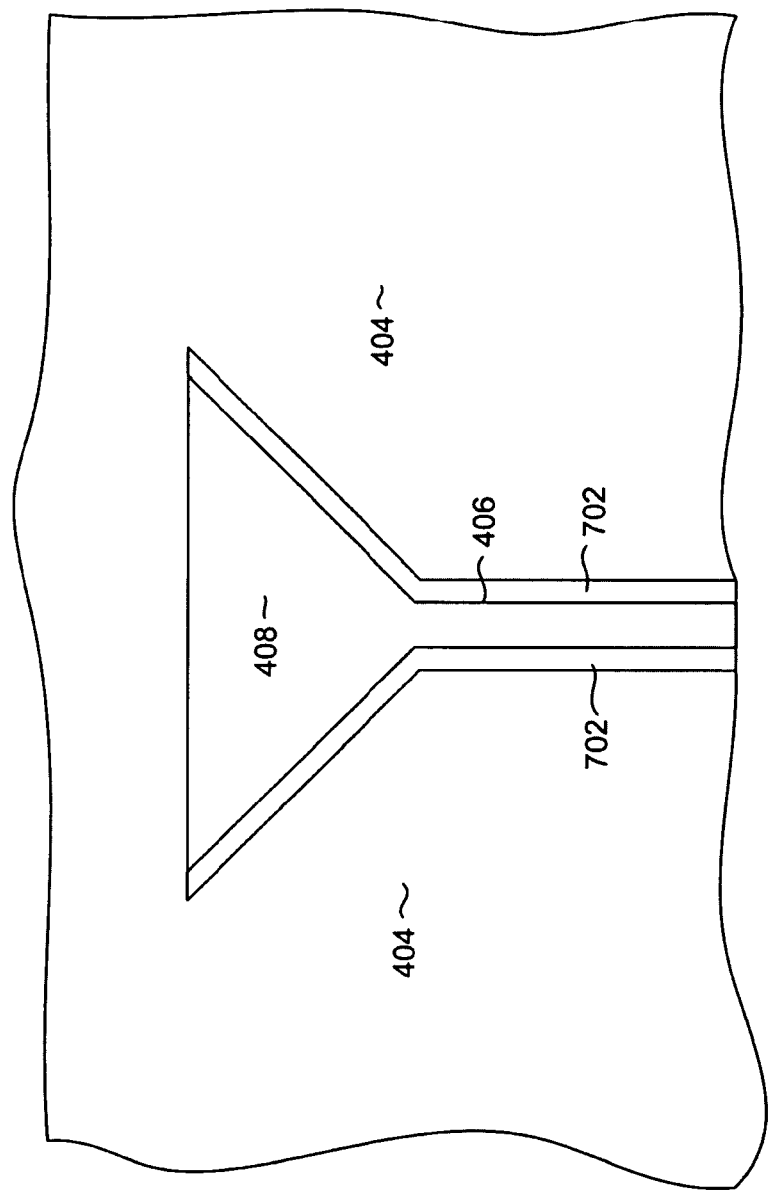

FIG. 9 shows a top down view of the structure as viewed from line 9-9 of FIG. 8. As viewed in FIG. 9, the write pole structure 406 is hidden beneath the hard mask layer 410 and non-magnetic side walls 702 are formed at the sides of the write pole 406. As can be seen, the non-magnetic side walls 702 have a substantially constant cross section at the pole tip and at the flared portion of the write pole 406.

Figure 10:
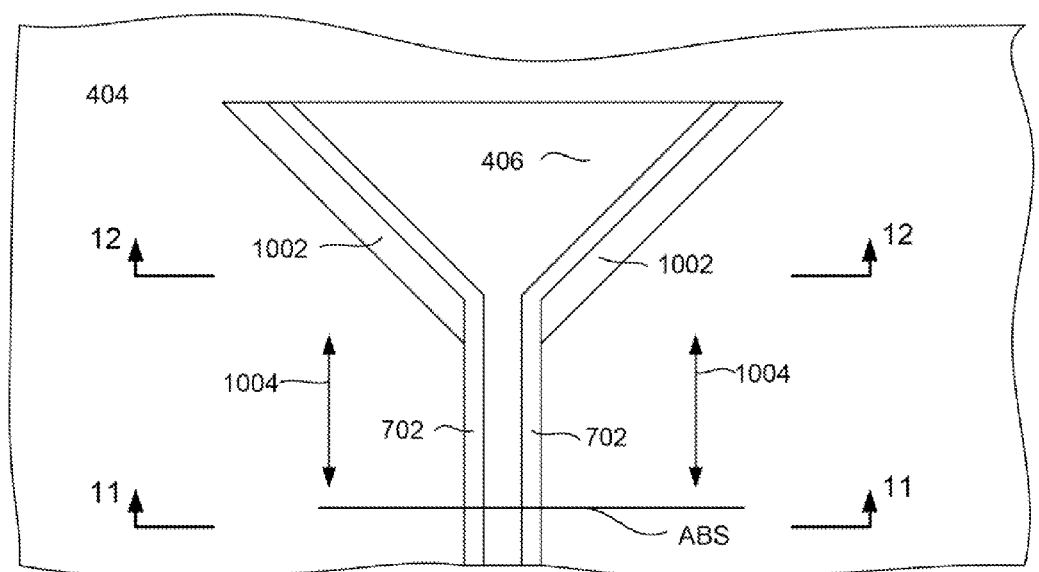

With reference now to FIG. 10, a non-magnetic material 1002 such as alumina, Ta, TaO, etc. is deposited. The non-magnetic material 1002 is deposited by a collimated sputtering process that causes the material 1002 to be deposited much more readily on the sides of the flared portion than on the sides of the pole tip portion. The collimated sputtering is performed in such a manner as to deposit the non-magnetic material 1002 primarily in a direction perpendicular to an air bearing surface plane (ABS) as indicated by the arrows 1004 This collimated sputtering will be described in greater detail herein below.

Figure 11:
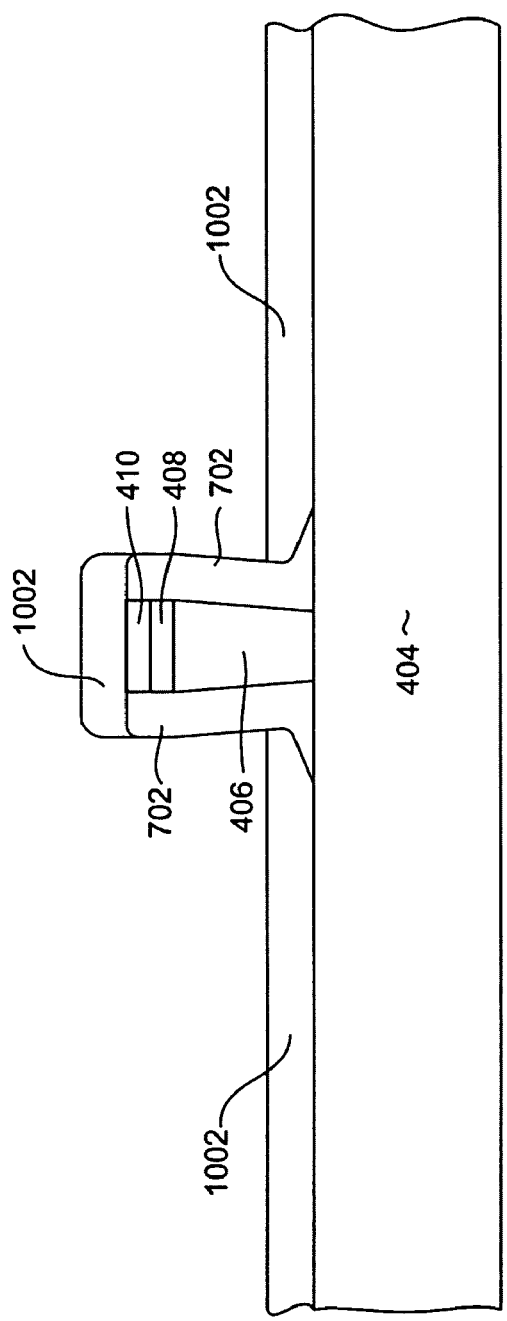
Figure 12:
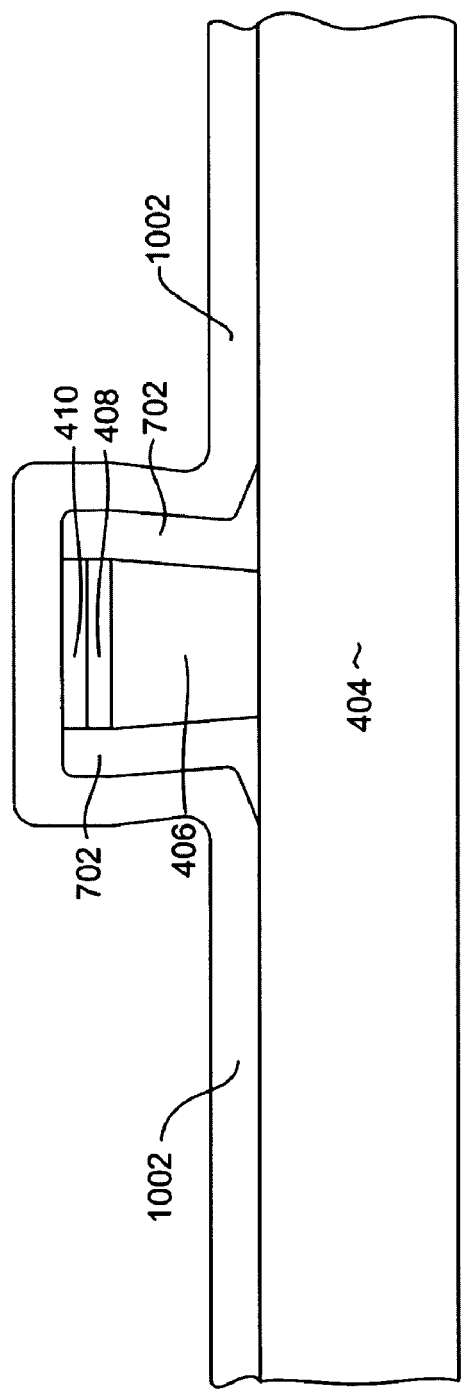

FIGS. 11 and 12 illustrate the results of this collimated sputtering as viewed in cross section from the lines 11-11 of FIG. 10 and 12-12 of FIG. 10. Therefore, FIG. 11 shows a cross section of the structure in the constant cross-section, pole tip portion of the write pole 406 and FIG. 12 shows a cross section of the flared portion of the write pole 406. With reference then to FIG. 11 it can be seen that the collimated sputter deposition deposits the non-magnetic layer 1002 on the top of the write pole 406 and hard mask layers 408, 410 and on the substrate 404, but with very little material 1002 being deposited on the sides of the non-magnetic side walls 702. However, as seen in FIG. 12, the non-magnetic material 1002 is deposited on the sides of the side gap layers 702 as well as on the tops of the write pole 406 and substrate 404.

Figure 13:
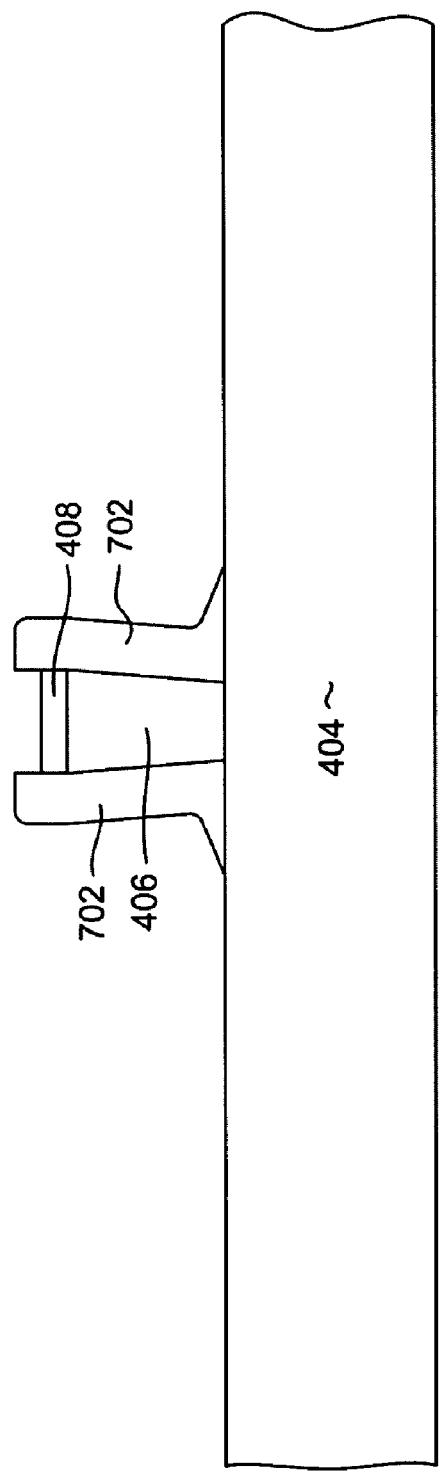
Figure 14:
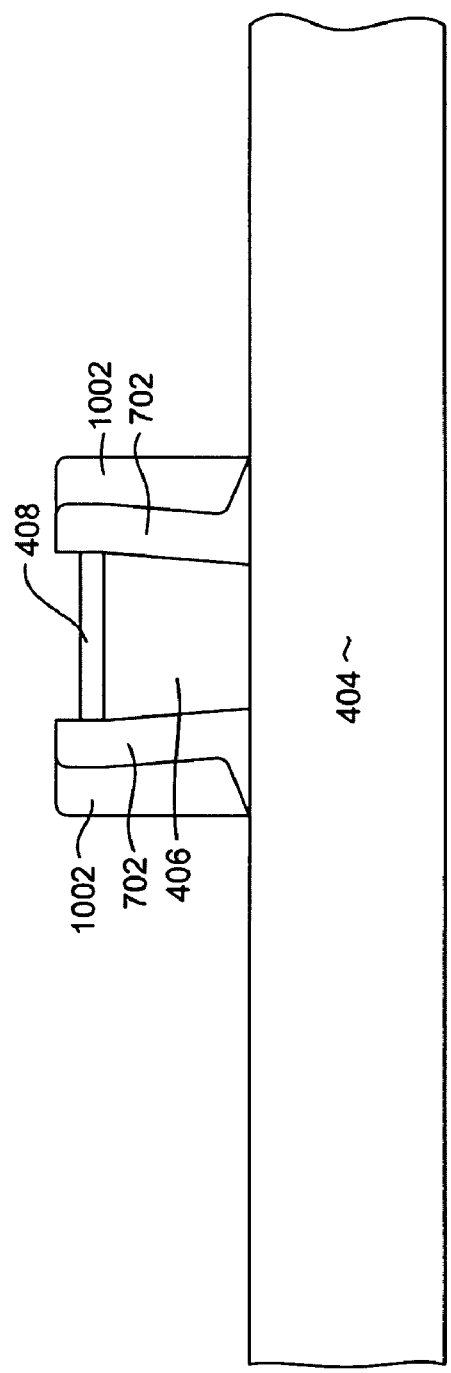

A material removal process such as reactive ion etching or ion milling is then performed to preferentially remove horizontally disposed portions of the deposited non-magnetic layer and also to remove the RIEable hard mask layer 410, leaving a structure such as shown in FIGS. 13 and 14. FIG. 13 shows a cross section taken at the pole tip portion, and as can be seen, the non-magnetic layer 1002 (FIG. 11) has essentially been completely removed. However, as seen in FIG. 14 which shows a cross sectional view at the flared portion of the write pole 406 vertical side walls of the non-magnetic material 1002 remain, thereby creating a wider non-magnetic side wall that is the sum of the side gap layer 702 and layer 1002.

Figure 15:
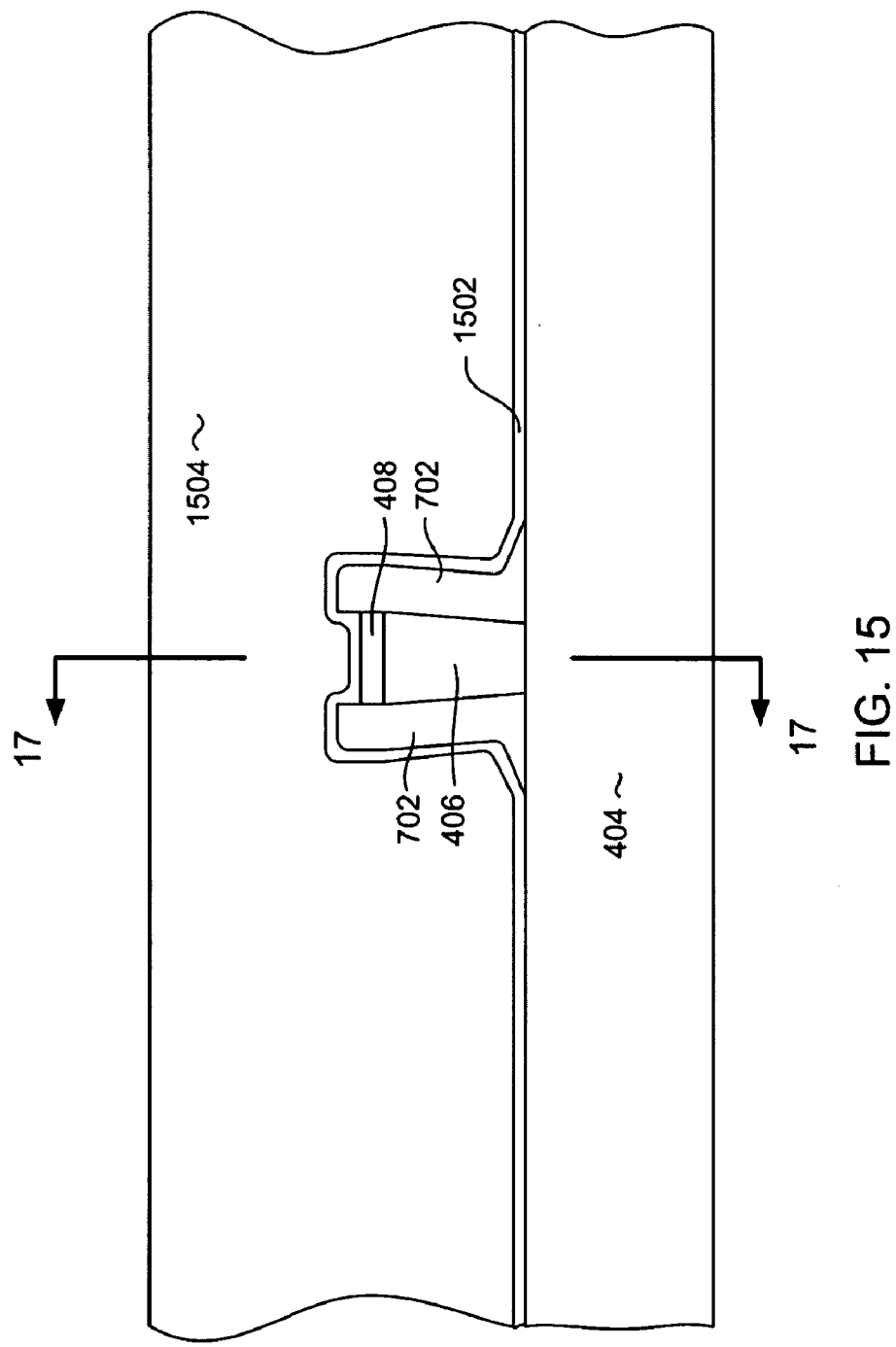
Figure 16:
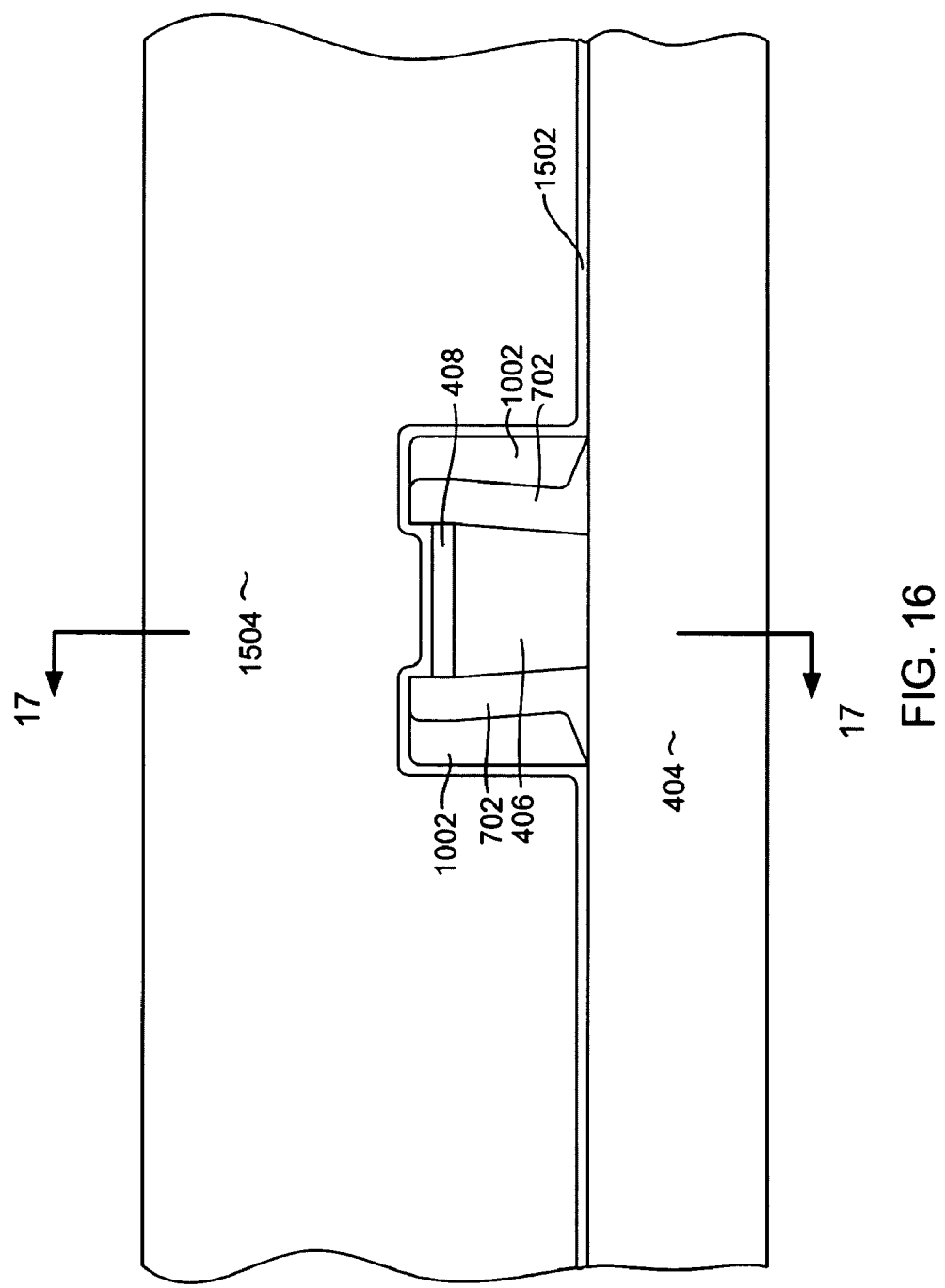
Figure 17:
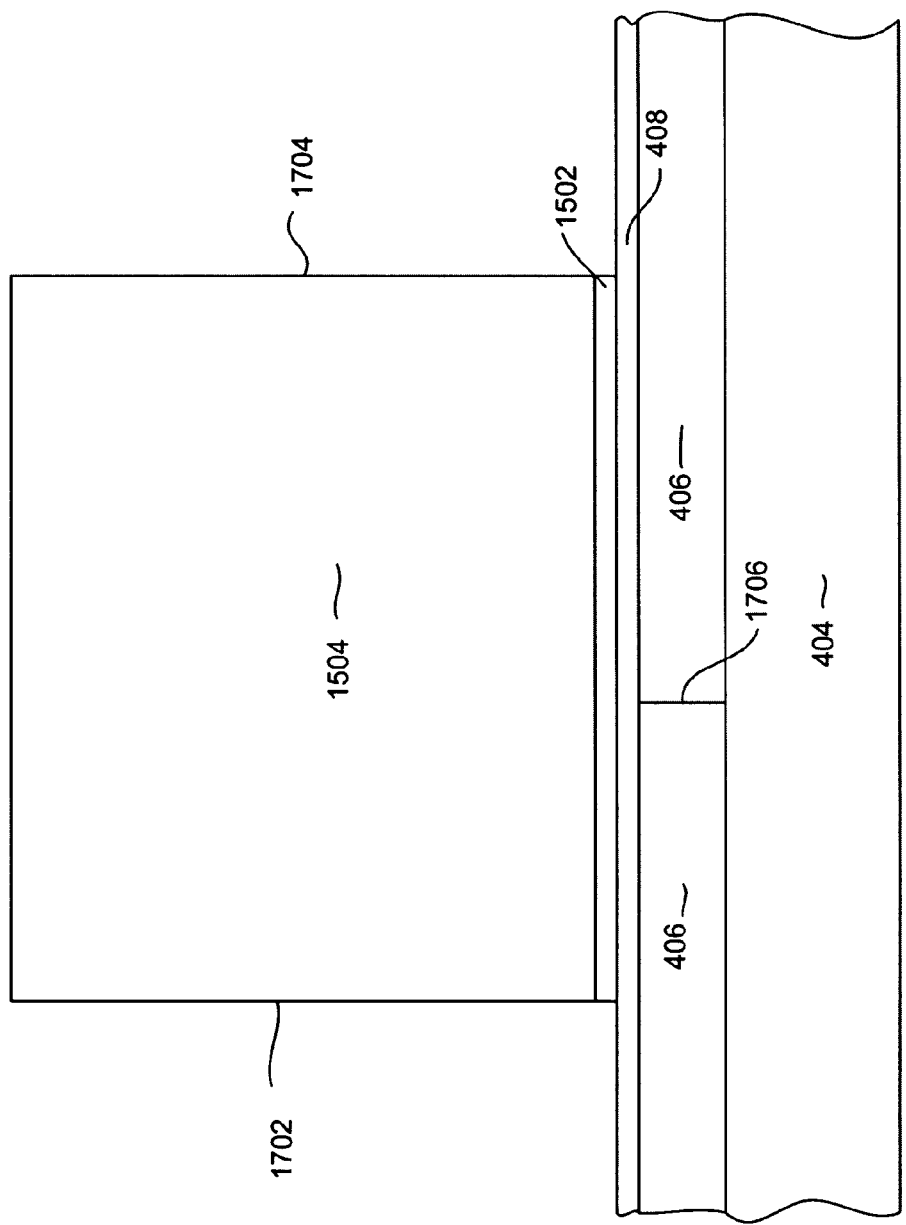

With reference to FIGS. 15, 16 and 17 a magnetic, electrically conductive seed layer 1502 is deposited and a magnetic shield 1504 is electroplated onto the seed layer 1502. FIG. 15 shows a cross section in the pole tip region and FIG. 16 shows a cross section in the flared region. As can be seen, the magnetic shield has a wider side gap in the flared region than in the pole tip region due to the presence of the additional non-magnetic side gap layer 1002.

The magnetic shield 1504 can be electroplated into a photoresist plating frame mask (not shown) to form a trailing shield having front and back edges 1702, 1704 as shown in FIG. 17. The front and back edges 1702, 1704 can be located on opposite sides of the flare point 1706. An ion milling can be performed to remove portions of the seed layer 1502 that are not protected by the shield 1504.

Figure 18:
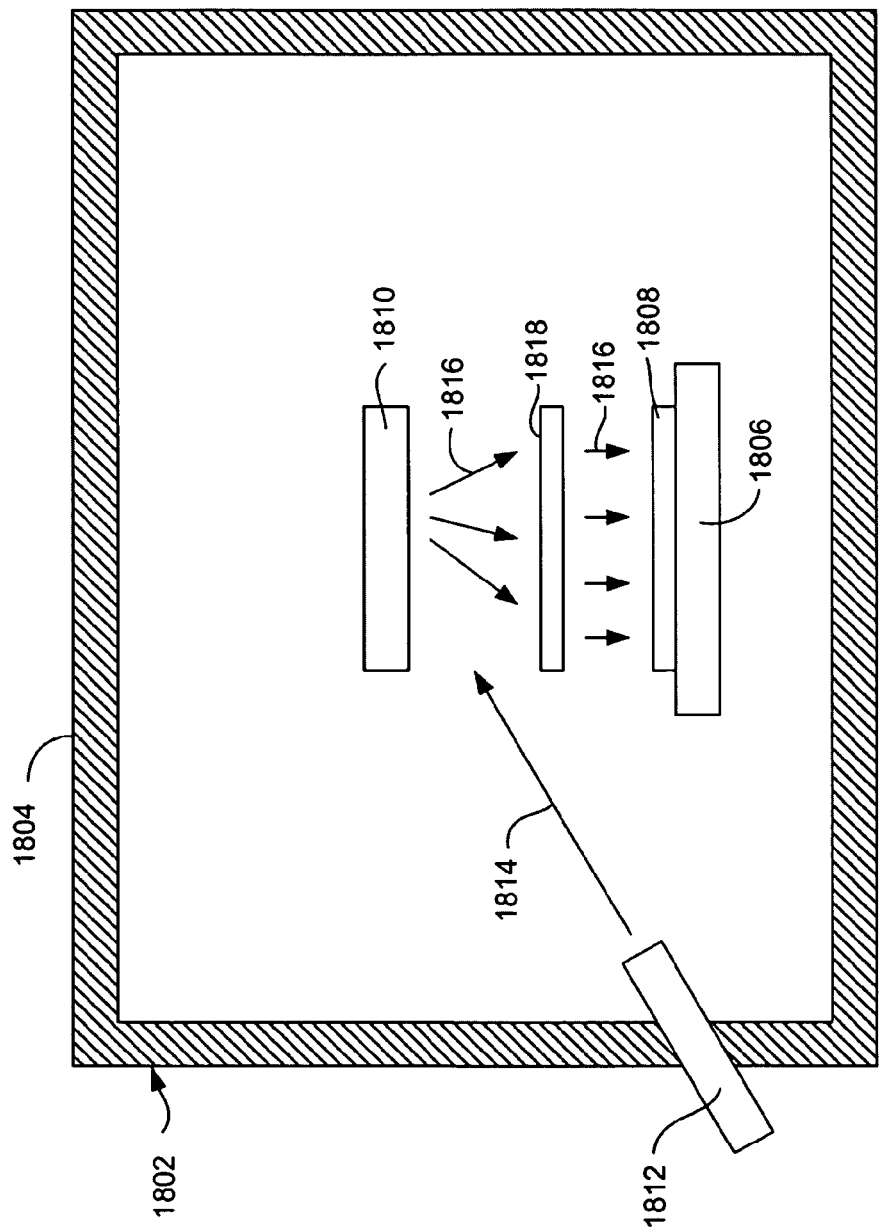
FIGS. 18-19 schematically illustrate a collimated deposition process.
Figure 19:
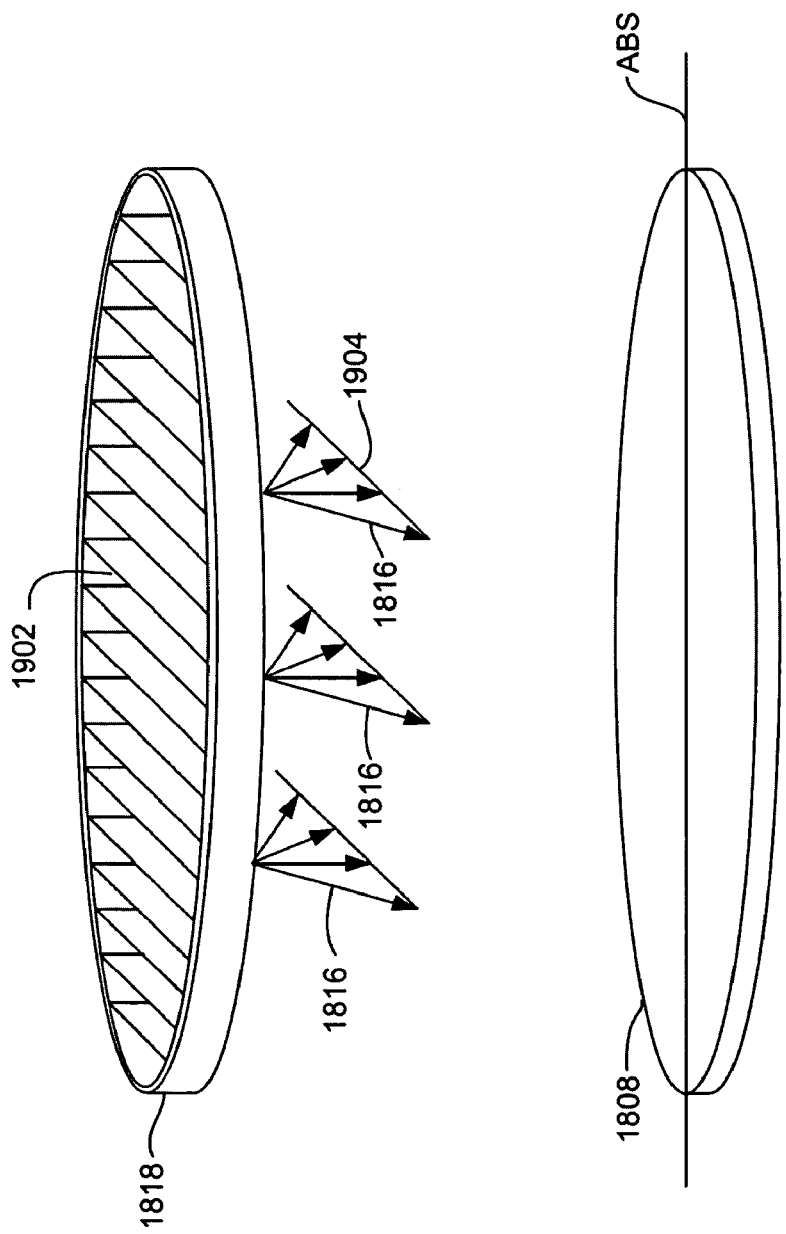

With reference now to FIGS. 18 and 19, a collimated sputtering process will be described in greater detail. With particular reference to FIG. 18, the sputtering operation is performed in a sputter deposition tool 1802 that includes a chamber 1804. A chuck 1806 is mounted within the chamber. The chuck 1806 supports a wafer 1808 within the chamber 1804. A target 1810 is also mounted within the chamber, the target being constructed of a material to be sputter deposited. An ion beam gun 1812 directs an ion beam 1814 at the target 1810. This ion beam 1814 dislodges particles 1816 in the form of atoms and/or ions from the target 1810 which travel toward the wafer 1808. As can be seen, the particles 1816 as they are initially dislodged from the target 1810 travel in random directions. However, as shown in FIG. 18, a collimator 1818 is provided within the chamber, the collimator 1818 being located between the target 1810 and the wafer 1808. The collimator acts to orient the particles along a desired plane, so that particles 1816 being deposited onto the wafer 1808 are deposited primarily along a desired plane.

This can be seen more clearly with reference to FIG. 19, which shows a perspective view of the wafer 1808 and collimator 1816. The collimator 1818 can be configured with slots 1902 that align the particles 1816 in a desired direction. For example, for the above described embodiment, the collimator 1902 is arranged so as to align the particles 1816 along a plane in a direction 1904 oriented substantially perpendicular to an air bearing surface plane that is oriented as indicated by the line labeled ABS.

Figure 20:
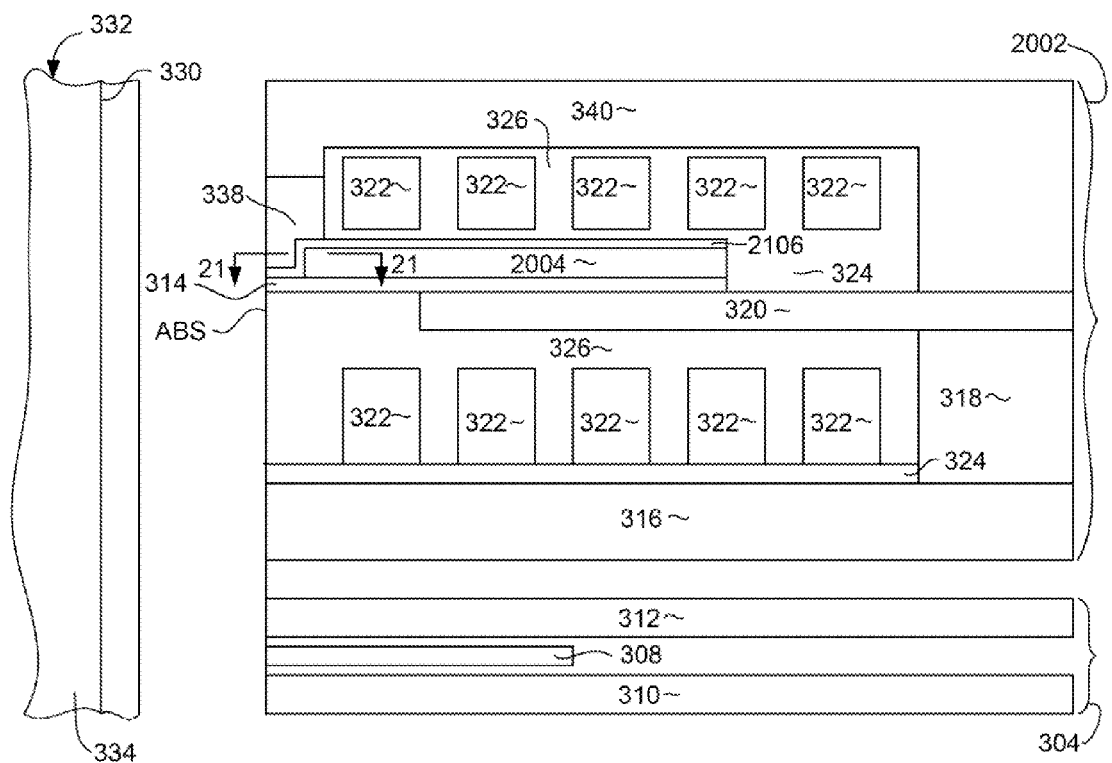
FIGS. 20-23 are views of a write head in various intermediate stages of manufacture illustrating a method for manufacturing a write head according to another embodiment of the invention.
Figure 21:
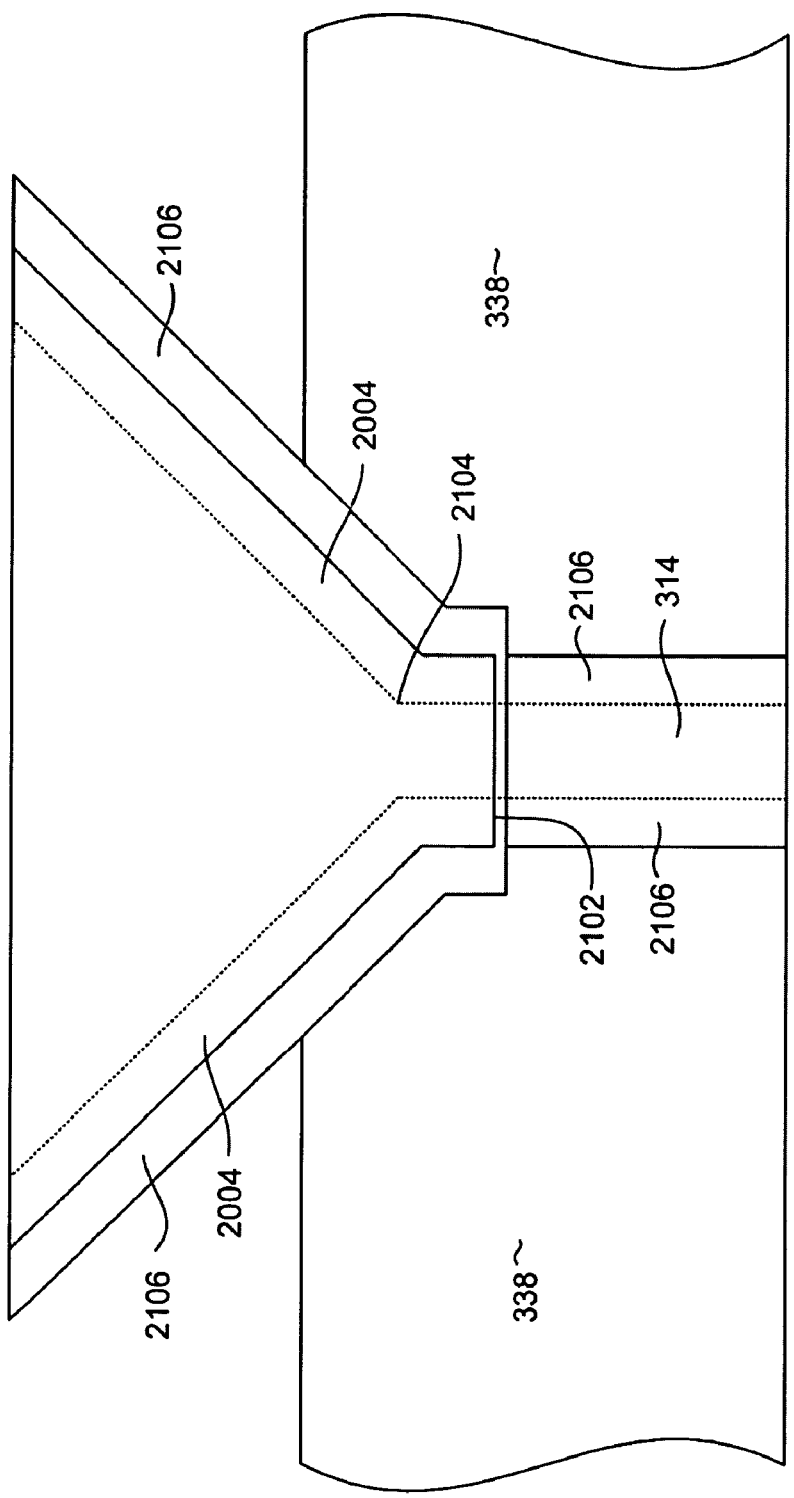

With reference now to FIGS. 20 and 21 a write head 2002 according to an alternate embodiment of the invention is described. This embodiment includes a stitched magnetic layer 2004 that defines a stitched flare point for more accurate flare point location relative to the ABS. The stitched magnetic layer 2002 is formed over the write pole 314, and wraps around the write pole 314 as can be seen more clearly with reference to FIG. 21 which shows a top down sectional view taken from the line 21-21 of FIG. 20.

With reference then to FIG. 21, the write pole 314 has stitched magnetic layer formed thereover. The stitched magnetic layer has a front edge 2102, located in front of the flare point 2104, and which defines a stitched flare point. A non-magnetic side gap layer 2106 is provided at the sides of the write pole 314 in the pole tip region to provide a desired non-magnetic side gap separation between the write pole 314 and the magnetic shield 338 which is not shown in FIG. 21.

This magnetic layer 2106 is also formed at sides of the stitched pole 2004, thereby providing a side gap for the stitched magnetic layer 2004. As can be seen with reference to FIG. 20, the non-magnetic layer 2106 also provides a separation between the trailing shield 338 and the stitched magnetic layer 2004.

Therefore, the non-magnetic layer 2106 provides non-magnetic spacing between the stitched magnetic pole 2004 and the trailing shield 338 both at the sides of the stitched pole 2004 and at the front edge 2102 of the stitched pole 2004. However, to maximize magnetic performance, the spacing between the stitched pole 2004 and the shield 338 must be much smaller at the front edge 2102 than at the sides of the stitched pole 2004. Therefore, the non-magnetic layer 2106 is much thinner at the front edge 2102 of the stitched pole 2004 than at the sides of the stitched pole. The present invention provides a method for constructing such a non-magnetic layer 2004, which is described below.

Figure 22:
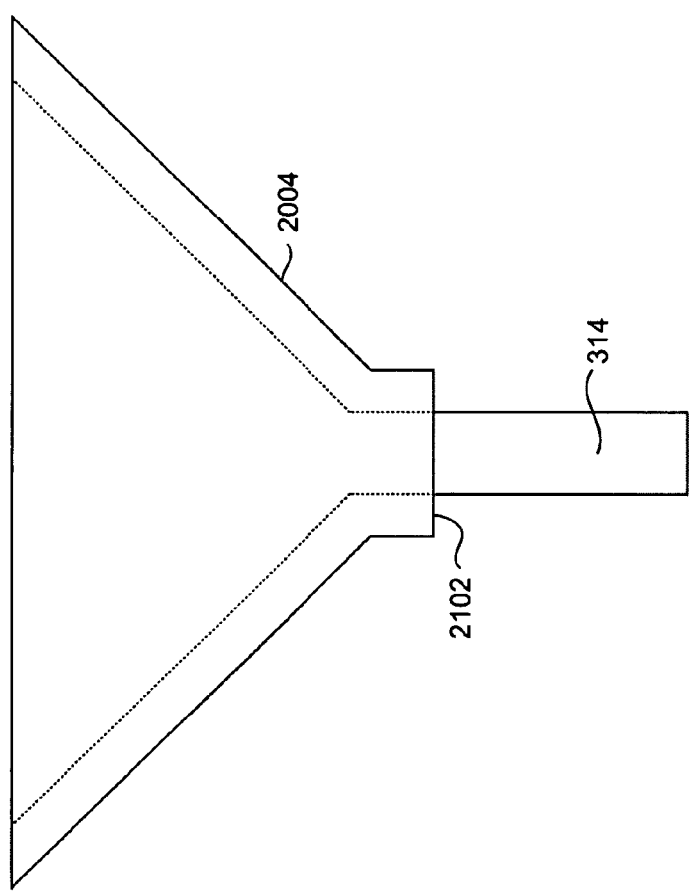
Figure 23:
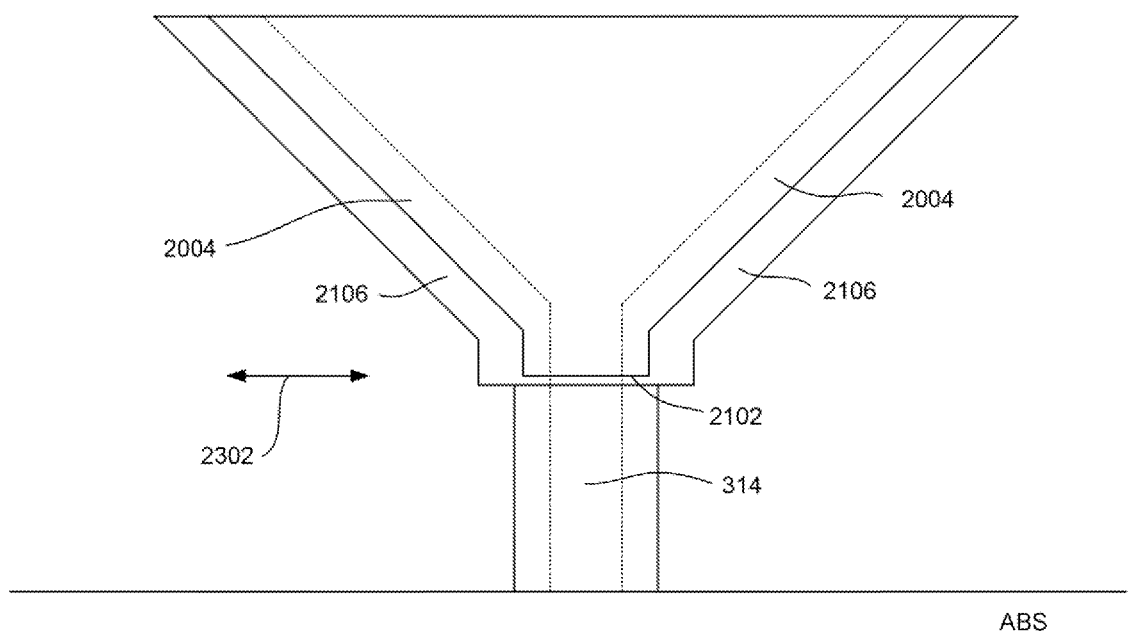

With reference now to FIGS. 22-23 a method is described for manufacturing a magnetic write head such as that described above. As shown in FIG. 22, a write pole 314 is formed, such as by the previously described processes. Then, a stitched magnetic pole layer 2004 is electroplated over a back portion of the write pole. To form such a magnetic layer 2004, a mask structure (not shown) can be formed over the pole tip region of the write pole so that the electroplated stitched magnetic pole layer 2004 has a desired front edge 2102. The portions of the write pole 314 that are hidden beneath the stitched magnetic pole layer 2004 are shown in dotted line.

Then, with reference to FIG. 23, a collimated sputtering deposition of a non-magnetic material such as alumina, Ta, TaO, etc. 2106 is performed. This collimated sputtering is performed in a manner such as described above with reference to FIGS. 18 and 19, except that the orientation of the collimator 1818 (FIG. 19) is rotated 90 degrees. This means that the material 2106 is deposited primarily in a plane that is parallel with the ABS plane as indicated by double headed arrow symbol 2302. This collimated sputter deposition of the non-magnetic material 2106 causes the non-magnetic material 2106 to be deposited much more readily on the sides of the write pole 314 and stitched pole layer 2004 than on the front surface 2102. This forms the non-magnetic layer with the desired larger thickness at the sides and smaller thickness at the front edge 2102 as discussed above with reference to FIGS. 20 and 21.

After the collimated deposition of the non-magnetic material 2106, a material removal process such as ion milling or reactive ion etching can be performed to remove all or a potion of the non-magnetic material from the tops of the write pole 314 and stitched pole layer 2004 as desired. A magnetic, trailing, wrap-around shield, can then be electroplated over the write pole 314 and stitched pole 2004 after an electrically conductive seed-layer is deposited.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A write head for perpendicular magnetic recording, comprising
    a magnetic write pole having a pole tip portion extending to an air bearing surface and a flared portion removed from the air bearing surface, the flared portion and pole tip portion meeting at a flare point;
    a stitched magnetic layer formed over a portion of the write pole, the stitched magnetic layer having a front edge and first and second laterally opposed sides;
    a non-magnetic layer formed over the first and second sides of the stitched magnetic layer and over the front edge of the stitched magnetic layer, the non-magnetic layer having a greater thickness at the sides of the stitched magnetic layer than at the front edge of the stitched magnetic layer.

2. A write head as in claim 1 wherein the write pole has first and second sides, and wherein the non-magnetic layer covers the sides of the write pole in an exposed portion of the pole tip portion, and wherein the non-magnetic layer has a thickness at the sides of the write pole in the pole tip region that is larger than the thickness at the front edge of the stitched flare portion.

3. A write head as in claim 1 further comprising a magnetic shield formed over at least a portion of the write pole and the non-magnetic layer.

* * * * *